Sept. 12, 1933.         J. F. TOWNSEND                 1,926,465
                         PAINTING MACHINE
                        Filed May 20, 1929            3 Sheets-Sheet 1
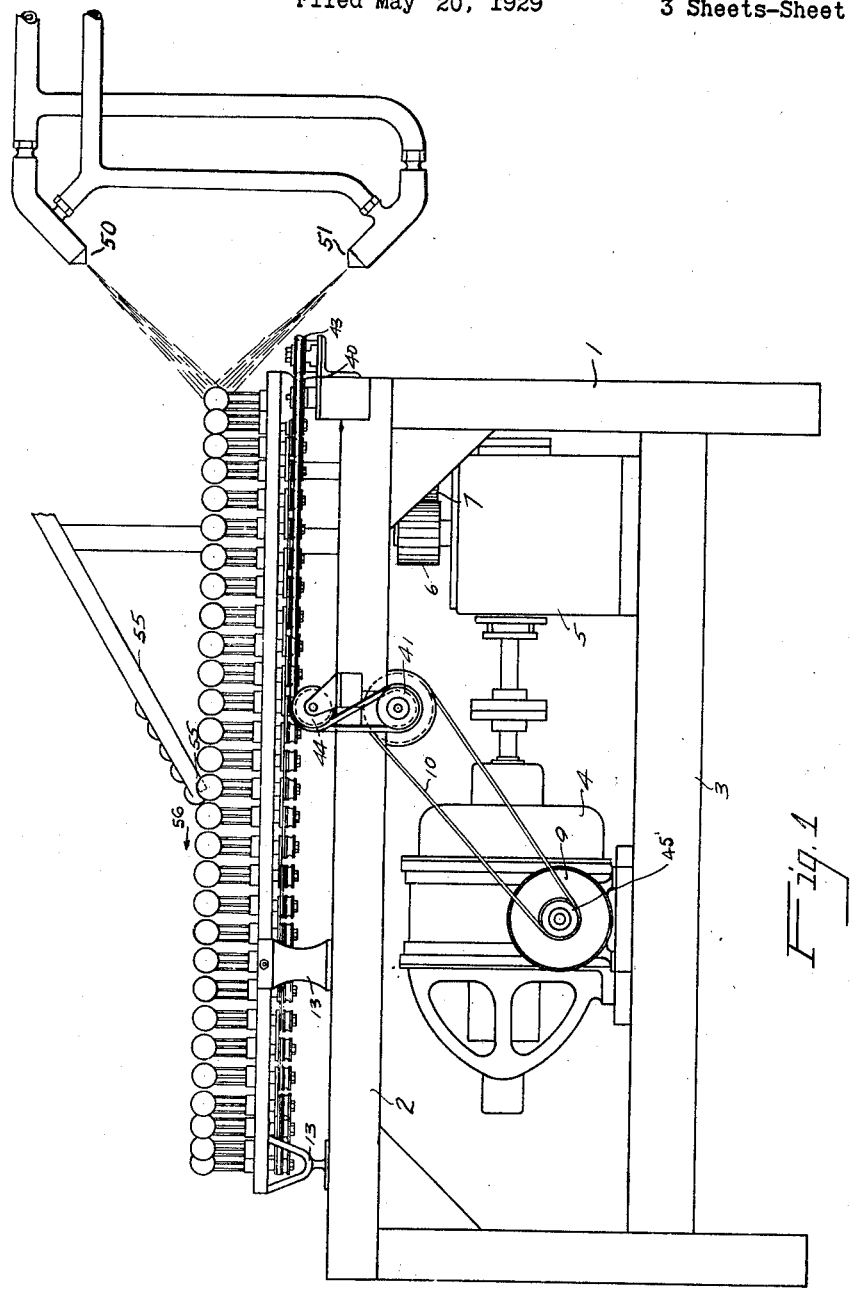
Joseph Franklin Townsend  Inventor
By Frank M. Slough
Attorney Sept. 12, 1933.                J. F. TOWNSEND                1,926,465
                               PAINTING MACHINE
                              Filed May 20, 1929            3 Sheets-Sheet 2
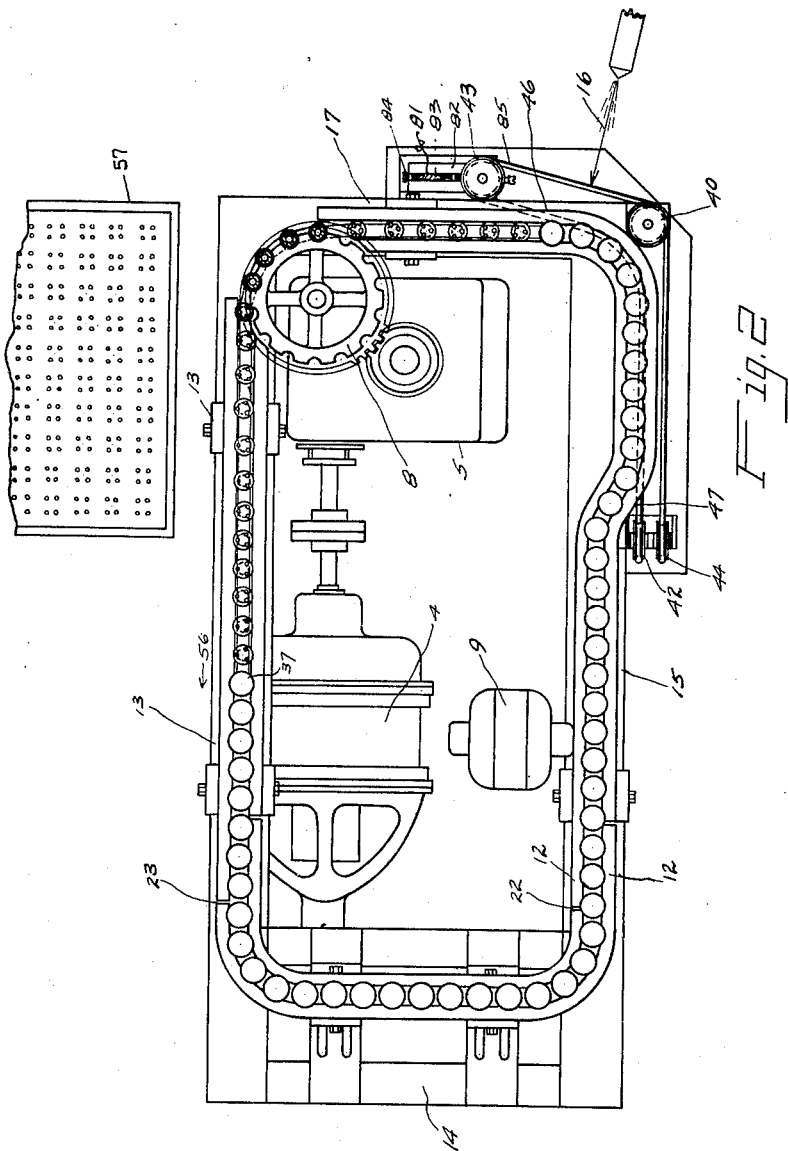
Joseph Franklin Townsend  Inventor
By Frank M. Slough
Attorney Sept. 12, 1933.   J. F. TOWNSEND   1,926,465
PAINTING MACHINE
Filed May 20, 1929   3 Sheets-Sheet 3
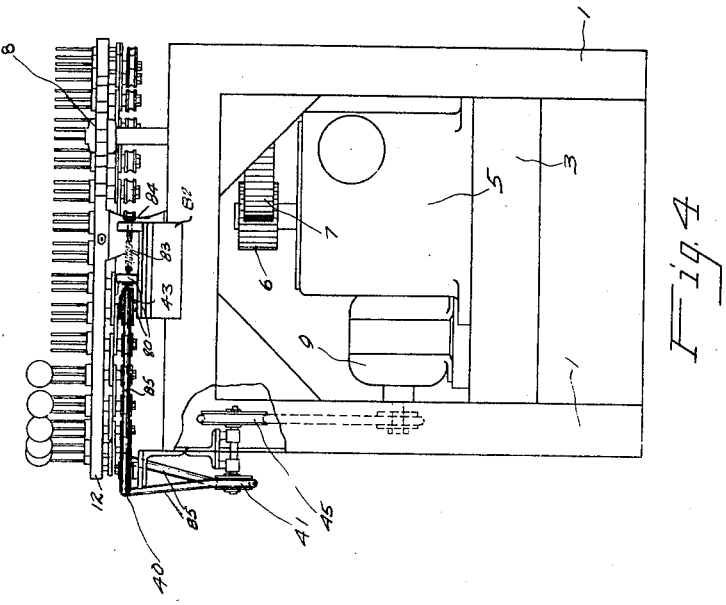
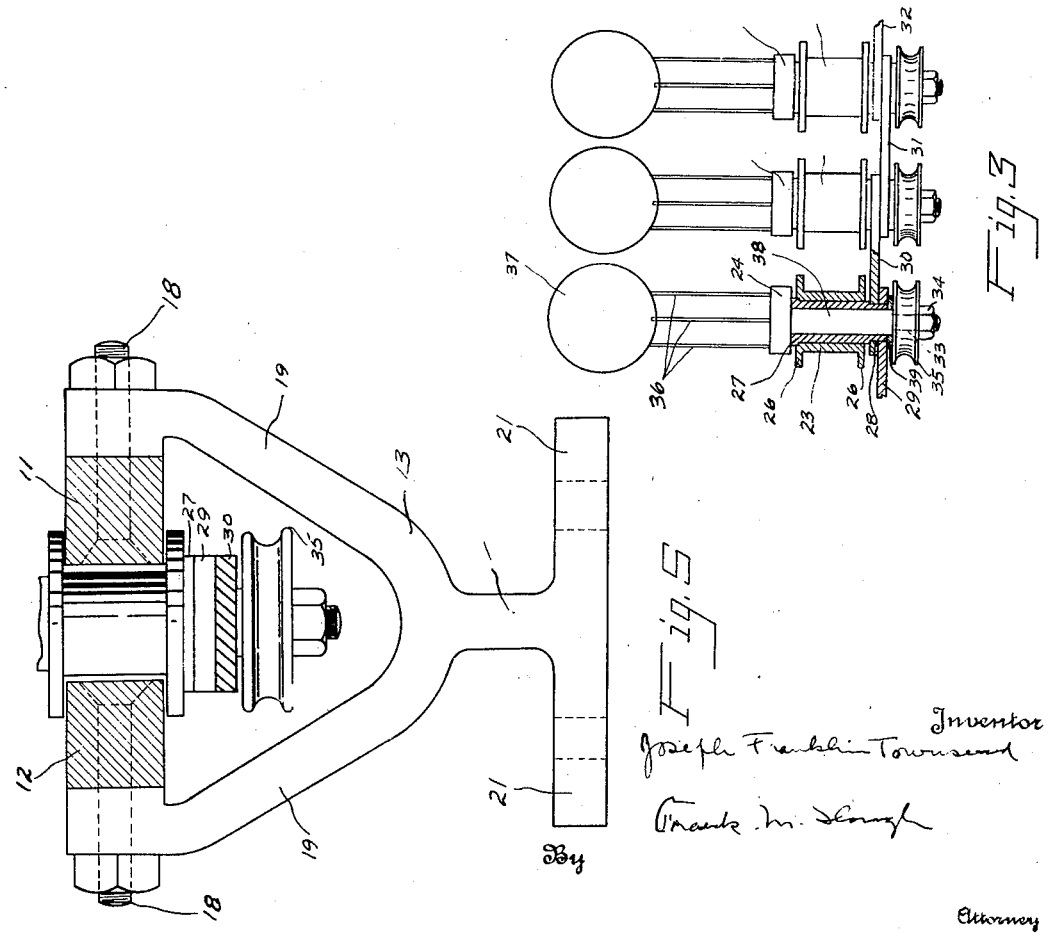

Patented Sept. 12, 1933

1,926,465

UNITED STATES PATENT OFFICE 1,926,465

PAINTING MACHINE

Joseph Franklin Townsend, Elyria, Ohio, assignor to The Worthington Ball Company, Elyria, Ohio, a corporation of Ohio Application May 20, 1929. Serial No. 364,425

3 Claims. (Cl. 91—45)

My invention relates to painting machines and relates particularly to painting machines adaptable for use in the painting of spherical objects such as golf balls.

Golf balls as commonly manufactured of rubber material, require to be given a tough elastic finishing coat of a paint material applied while fluent, and thereafter congealed to give the ball the bright white color usually desired.

It is very important that the paint material be applied evenly all over the surface of the ball and that a uniform amount of material be applied to each ball, since golf balls are commonly required to be held to close limits with respect to diameter and weight; also an uneven coating will tend to unbalance the ball, and a ball unevenly coated with paint will be more susceptible to dislodgment of portions of the paint unevenly applied.

An object, therefore, of my invention is to provide for the uniform placement of a fluent paint material on golf balls or the like.

Another object of my invention is to provide for the rapid consecutive placement of fluent paint material on golf balls in commercial production.

Another object of my invention is to provide for the efficient conveyance of the golf balls from a hopper or other like source of supply to the painting mechanism and for the efficient and rapid conveyance of the painted balls therefrom, in such manner whereby the balls coated with congealable paint material may be distracted from the painting mechanism without injury to the applied coat of paint.

Another object of my invention is to provide for the efficient and rapid consecutive painting of golf balls or the like.

Other objects of my invention and the invention itself will become apparent by reference to the following description of an embodiment of my invention, made especially applicable to the painting of golf balls, and the drawings referred to therein which illustrate the said embodiment.

Referring to the drawings:

Fig. 1 illustrates in side elevational view, a mechanism for conveying golf balls from a loading station to a painting station, and for rapidly rotating the balls in rapidly changing planes while subjected to the converging jets of atomized paint material. In this view certain parts of the mechanism are omitted for simplicity, and to facilitate a better understanding of the other parts illustrated, as will be further made clear.

Fig. 2 is a plan view of the apparatus of Fig. 1. In this figure certain of the ball conveyers engaging the driving sprocket, are shown in transverse section. In this figure also the trough is omitted to permit a better view of the underlying holder guiding rails.

Fig. 3 is a view partly in side elevation and partly in medial section, of a series of ball holders, for the conveyor mechanism of the foregoing figures.

Fig. 4 is an end elevational view of the mechanism of Figs. 1 and 2.

Fig. 5 is a view of a rail support, a pair of supported opposed cooperating spaced rails being illustrated in section and a ball holding spool roller being illustrated therebetween in elevational view.

Referring now to the different figures of drawing in all of which like parts are designated by like reference characters, the mechanism of my invention may be supported on a table, as illustrated, having legs 1, a table top 2 forming the supporting bed for the mechanism, and an underlying shelf 3 supporting the driving mechanism comprising an electric driving motor 4, and a gear box 5 housing a series of speed reducing gears through which, and gears 6 and 7, a driving sprocket 8 projects above the level of the table top or bed 2.

The sprocket 8 may be continuously rotated at a relatively slow rotational rate, which may for different operative purposes vary from about 2½ revolutions per minute up to 10 revolutions per minute.

The sprocket, as will later appear, effects the continuous processional driving of a series of ball holders to and from the painting jet station.

A second electric motor 9, carried by the shelf 3, through a belt 10 effects a rapid spinning of the ball holders when at and immediately adjacent the painting jet station, as will later more fully appear.

A pair of spaced rails 11 and 12 is supported at intervals by supports such as 13, see Fig. 5, and extend approximately tangentially from the sprocket wheel 8 on the side of the mechanism devoted to the "loading" operation, then transversely across the end 14 to the side where, in a portion on the approach side of the so-called "painting jet station", the position of which is indicated by the arrow 16, the parallel rails are deflected outwardly laterally of the border 15 and is arcuately continued to merge with the parallel rail portions disposed above the end border 17 of the body, terminating adjacent the sprocket 8 in approximately tangential relation therewith.

The parallel rails 11 and 12 in the embodiment illustrated, are of rectangular cross-sectional form, see Fig. 5, and are bolted at intervals by bolts such as 18 to the upper ends of the diverging forks 19 of the bifurcated rail support 13, having the pedestal flanges 21 by which they are secured to the bed 2. The parallel rails 11 and 12 are not necessarily continuous throughout their length, but may be broken at intervals as shown at 22 and 23, as a convenience in manufacture. The rails, of course, are also interrupted in their portions contiguous to the sprocket 8, since the sprocket receives from the rails the spool roller elements 23 of the ball holders, generally indicated at 24, being in driving relation with the holders.

The spool roller elements 23 are associated with the ball holders 24 in the manner perhaps best illustrated in Fig. 3, wherein the roller elements 23 are illustrated as being in the form of a spool having end flanges 26; bushings 27 of non-friction material are telescoped within the axial bore of the spools and projecting by a reduced portion 28 through aligned apertures of successive chain links such as 29, 30, interlinking their abutting perforated ends. Spindles 38 depend axially from the ball holders 24 to which they are rigidly secured and extend through and beyond the bushing 27.

The spindles are provided with reduced ends 33, as indicated in dotted lines for the left hand spindle of Fig. 3, being threaded at their ends for the reception of a nut 34 which rigidly secures a peripherally grooved pulley 35 against the spindle shoulder formed by the reduction of spindle diameter, a suitable washer 39 being disposed about the spindle intermediate the pulley 35 and abutting the bushing 27.

By virtue of this construction, the spindles are provided with terminal flanges, the one comprising the holder element 24, the other comprising the pulley 35 and is provided with a tubular bearing bushing 27 for engagement with the so-called spindle flanges.

A plurality of relatively long and slender ball supporting pins 36, herein illustrated as being three in number, are rigidly secured by their lower ends in each holder support 24 and are preferably equidistant from each other and of approximately equal length.

The golf balls, or other balls, shown at 37 are adapted to rest on the upper end of the pins 36 to be rotated thereby when the spindles 38 are rotated during the operation of the machine by rotation of the pulleys 35 affixed to the lower ends of the spindles as described.

The spindles are axially separated each from the other by a distance slightly in excess of the diameter of the balls adapted to be supported by the pins thereon so that in the normal operation of the device, the balls will always be slightly separated each from the other.

The successive links such as 29 to 32 inclusive comprise links of a continuous chain extending below and intermediate the parallel rails for the entire length of the rails and in addition extend across the break in the rails occupied by the holder spool engaging sprocket 8.

Each of the adjacent pairs of links are joined by a separate bushed ball holder spindle, the roller 23 of which is adapted to be guided by the parallel spaced rails 11 and 12, there being preferably an unbroken succession of equally spaced ball holders moving in a circuitous path from the loading station to the jet station 16 and therefrom to the sprocket 8, whereat balls painted by the operation of the jet at station 16, will be removed from the pins upon which they are supported, either manually or in any other suitable way.

40, 41, 42, 43 and 44 show a plurality of pulleys journalled to the supporting table, of which the pulleys 40 and 43 are disposed to rotate in a horizontal plane, whereas the others are vertically rotatable, adapted to cooperate with a driven pulley 45' driven by the motor 4, whereby a continuous belt 85 of preferably rounded cross-sectional form may be passed over all of the pulleys 40 to 44 inclusive in such a way that portions thereof, indicated at 46 and 47, will engage the outwardly disposed peripheral portions of the grooves of the pulleys 35 affixed to the bottom ends of the spindles 38, and for as long as such pulleys are approaching the jet position 16 and until they have been moved substantially therefrom toward the sprocket 8. The pulley 43 is journalled upon a bracket 80 which is slidable in a slideway 81 of a supporting member 82 which is bolted to the table and is adapted to hold the belt 85 under tension by a spring 83 secured to the bracket 80 and an adjusting screw 84.

The speed of the motor 9 and the speed of the pulley 41, which is driven from the motor, is such that the contact between the pulley portions 35 and the belt 85 will cause these pulleys to be rotated at a high rate of speed to spin the ball holders 24 and the carried balls 37 supported on the ball holder pins 36 at a very high rate.

As before stated, these pins are slender and long and rapid rotation will tend to throw their ends outwardly and this tendency, though not sufficient to cause separation from the balls, acting irregularly unequally on the different pins of a holder, will rotate the ball on rapidly changing planes of rotation whereby practically all faces of the ball will be exposed to each of the painting jets emanating from nozzles 50 and 51 disposed preferably one above the other and at approximately a 90° relative angular relation to the so-called jet station 16, and the jets will converge upon the same ball simultaneously while the ball is being rapidly spun on rapidly changing axes and while being moved bodily by the link chain underlying the rails as above described, and by the propelling influence of the continuously rotated sprocket 8.

To the nozzles 50 and 51, which are of any well-known atomizing type, commonly employed for such painting purposes, air under high pressure and liquid paint under a relatively lower pressure, is continuously supplied and emerges together in a practically atomized stream forming converging jets, as before described, and striking against the outer surface of the ball at slightly spaced portions one above the other while the ball is spinning on indifferently variable axes.

The atomizing operation being not a part of this invention and being a part of the prior art, it is not described in detail nor is the supply of paint and air, paint reservoir and air pumps being well known and well known in association with each other for like purposes.

The loading apparatus is merely diagrammatically shown and comprises a hopper 53 suitably formed having an outlet spout 54 adapted to freely pass a stream of balls from the trough on to the wire pins 36 of the different ball holders. The balls descend by gravity through the trough 55, at an angle preferably not in excess of 45° from the horizontal, and one of the balls, such as 37, lodges on a set of holder pins 36, this ball, until sufficiently moved in the direction of the arrow 56, Fig. 1, will not permit the next succeeding ball to drop on to the next succeeding set of pins, but upon sufficient movement of the ball 37, the next ball will be permitted to drop and will first make engagement with the forward ball 37, subsequently subsiding by a rearward falling movement on the tops of the three pins of the next succeeding set.

The vertical plane of the trough will be understood to be disposed parallel to that of the rails 11 and 12 underlying the same and will be pointed in the direction of movement of the holders, as indicated by the arrow 56.

After the balls have reached the sprocket 8, they are removed by tongs, manually operated or otherwise, to a drying tray 57 or other apparatus of suitable form, for drying, after which the balls may be again put into the trough for the application of a second coat of paint.

Having thus described my invention as it has been embodied in a mechanism of certain specific construction, I am aware that the same may be embodied in structures varying widely from that herein illustrated and described but without departing from the spirit of my invention.

I claim:

1. In a machine for processing golf balls, a conveyer mechanism, a driving sprocket, a circuitous conveyer track extending from and returning to said sprocket, said track comprising a laterally spaced pair of longitudinally extending parallel track elements, supports for the track elements, a plurality of rollers disposed between the track elements being disposed in relative spaced relation longitudinally of the track and having upper and lower laterally extending flanges adapted for engagement with the upper and lower surfaces of said track elements, said rollers adapted for rotation on substantially vertical axes, ball supports carried by each roller for supporting a ball to be conveyed in the circuitous path of said track, chain means comprising chain links interconnecting said rollers, said rollers being suitably spaced to permit said rollers to fit between the sprocket cogs, a spindle journaled within each roller supporting said article support thereon and projecting from the opposite end of the roller from said support, a pulley secured on the projected end of the spindle, and a driving belt disposed adjacently to a portion of said track and making driving engagement with spindles passing said belt, and a ball processing means adapted to operate on passing balls disposed adjacent said belt, while being rotated thereby.

2. In a painting mechanism for golf balls, the combination of a series of ball holders, means for processionally moving the ball holders in a circuitous path, means for effecting rapid rotation of the ball holders at least a portion of said path painting jet means disposed adjacent such portion, comprising means to apply in an atomized jet, paint to balls carried by passing holders, a plurality comprising at least three upstanding pins supported by their lower ends on each of said holders and having upper ends disposed sufficiently close together as to cooperatively support a ball to be painted, loading means for said holders comprising an inclined trough extending convergingly toward the processionally moving balls on the approach side of the painting jet in the direction of movement of said balls, and adapted to effect downward movement of the balls therein on to the tops of each set of pins, said sets of pins being so spaced relative to the diameters of said balls and the degree of inclination of said trough being such that only one of said balls will be dropped on to each set of pins and to prevent dropping of a second ball until the first ball has processionally moved a predetermined distance to release the next succeeding ball for delivery to the next succeeding set of pins.

3. In a painting mechanism for balls, the combination of a series of ball holders, means for processionally moving the ball holders in circuitous path, painting means disposed adjacent at least a portion of said path comprising means to apply in an atomized jet, paint to balls carried by passing holders, said ball holders each comprising three or more grouped upwardly extending pointed elements adapted to cooperatively support a ball to be painted, loading means for said holders comprising an inclined ball guideway extending convergingly toward the processionally moving balls on the approach side of the painting jet in the direction of movement of said balls, and adapted to effect downward movement of the balls thereon, onto the supporting elements of each holder, said supporting elements on the holders being so spaced and the degree of inclination of said guideway being such that a downward prolongation of a straight line passing through the centers of the last two balls in the guideway will pass below a line extending between the upper ends of the more remote pins of a ball holder disposed in position to receive a ball, whereby only one of said balls will be dropped onto each holder and whereby, dropping of a second ball will be prevented until the first ball has processionally moved a predetermined distance to release the next succeeding ball for delivery to the next succeeding holder.

JOSEPH FRANKLIN TOWNSEND.